United States Patent
Meerdink et al.

[11] Patent Number: 6,152,815
[45] Date of Patent: Nov. 28, 2000

[54] DEVICE FOR SEPARATING BONE MATERIAL FROM A MEAT PIECE

[75] Inventors: Jan Johannes Meerdink, Ravenstein; Gerardus Leenen, Ayen, both of Netherlands

[73] Assignee: Stork MPS B.V., Lichtenvoorde, Netherlands

[21] Appl. No.: 09/124,337

[22] Filed: Jul. 29, 1998

[30] Foreign Application Priority Data

Jul. 30, 1997 [NL] Netherlands ............................ 1006691

[51] Int. Cl.$^7$ ........................ A22C 21/06; A22C 18/00; B23B 41/02; B23B 51/00

[52] U.S. Cl. ........................ 452/122; 452/156; 452/149; 408/204; 408/207

[58] Field of Search ..................... 452/135, 136, 452/122, 171, 156, 149, 120; 408/204, 207, 703; 30/342, 172, 273; 83/169, 427, 781

[56] References Cited

U.S. PATENT DOCUMENTS

| | | | |
|---|---|---|---|
| Re. 25,947 | 12/1965 | Bettcher | 452/149 |
| 239,056 | 3/1881 | Overhiser | 408/204 |
| 2,062,257 | 11/1936 | Douglas et al. | 408/204 |
| 2,423,601 | 7/1947 | MacArthur | 408/204 |
| 3,570,351 | 3/1971 | Spengler | 83/425 |
| 3,705,440 | 12/1972 | Lewis | 17/11 |
| 3,707,768 | 1/1973 | Spengler | 30/166 |
| 3,757,676 | 9/1973 | Pomara, Jr. | 99/450.6 |
| 4,023,271 | 5/1977 | Di Franco | 30/123 |
| 4,139,926 | 2/1979 | Hughes et al. | 452/160 |
| 4,153,973 | 5/1979 | Hughes et al. | 452/160 |
| 4,322,188 | 3/1982 | Hougen | 408/206 |
| 4,369,685 | 1/1983 | Trigg | 83/661 |
| 4,516,890 | 5/1985 | Beharry | 408/204 |
| 4,538,944 | 9/1985 | Hougen | 408/206 |
| 4,573,838 | 3/1986 | Omi et al. | 408/204 |
| 4,813,819 | 3/1989 | Hougen | 408/206 |
| 4,823,467 | 4/1989 | Campbell et al. | 30/355 |
| 4,907,344 | 3/1990 | Hahn | 30/355 |
| 4,968,192 | 11/1990 | Hamilton | 408/144 |
| 5,054,971 | 10/1991 | Kieninger et al. | 408/205 |
| 5,217,334 | 6/1993 | Miyazaki et al. | 408/206 |
| 5,254,031 | 10/1993 | Balke | 452/149 |
| 5,291,815 | 3/1994 | Riefenhauser | 83/837 |
| 5,360,300 | 11/1994 | Sullivan | 408/204 |
| 5,679,069 | 10/1997 | Van Ochten | 452/122 |
| 5,688,164 | 11/1997 | Mills et al. | 452/122 |
| 5,692,307 | 12/1997 | Whited et al. | 452/149 |
| 5,692,308 | 12/1997 | Di Libero | 30/353 |
| 5,697,935 | 12/1997 | Moran et al. | 606/104 |
| 5,724,868 | 3/1998 | Knudsen et al. | 76/104.1 |
| 5,741,176 | 4/1998 | Lapp et al. | 452/122 |
| 5,746,648 | 5/1998 | Boeyen et al. | 452/156 |
| 5,787,591 | 8/1998 | Lu | 30/355 |
| 5,791,837 | 8/1998 | Johnson | 408/204 |
| 5,803,678 | 9/1998 | Korb et al. | 408/206 |
| 5,832,615 | 11/1998 | Costen et al. | 30/517 |
| 5,881,610 | 3/1999 | Ashkenazi | 76/112 |
| 5,979,285 | 11/1999 | Rasmussen et al. | 83/676 |

FOREIGN PATENT DOCUMENTS

| | | | |
|---|---|---|---|
| 516888 | 12/1992 | European Pat. Off. | 452/149 |
| 2642614 | 8/1990 | France . | |
| 2049561 | 2/1990 | Japan | 452/149 |
| 9402036 | 7/1996 | Netherlands . | |

*Primary Examiner*—Peter M. Poon
*Assistant Examiner*—Fredrick T. French, III
*Attorney, Agent, or Firm*—Webb Ziesenheim Logsdon Orkin & Hanson, P.C.

[57] ABSTRACT

A device for separating bone material from meat tissue in a meat piece, such as a spine from a half part of a slaughtered animal, which device is provided with a support for the meat piece for processing and a separating member with a curved separating edge which is movably driven relative to the support and includes plate material, wherein the separating edge is provided with a series of teeth, each of which is embodied with a guide surface directed toward the inner side of the bend such that when bone material is severed it is carried away to the inside and contamination of the meat material is thereby avoided.

20 Claims, 4 Drawing Sheets

DEVICE FOR SEPARATING BONE MATERIAL FROM A MEAT PIECE

BACKGROUND OF THE INVENTION

The invention relates to a device for separating bone material from meat tissue in a meat piece, such as a spine from a half part of a slaughtered animal, which device is provided with a support for the meat piece for processing and a separating member with a curved separating edge which is movably driven relative to the support and consists of plate material.

Such a device has already been described in the earlier Netherlands patent application 9402036.

The tubular separating member is provided on the end edge with a saw tooth which serves to saw through the bone tissue. It has been determined experimentally however that a conventional saw for the meat tissue functions less well. There is moreover the danger that the material chipped from the bone remains behind in the meat piece, which adversely affects the quality of the end product.

SUMMARY OF THE INVENTION

The invention has for its object to provide a device of the type described above with which the above stated drawbacks are obviated. The device according to the invention is distinguished in that the separating edge is provided with a series of teeth, each of which is embodied with a guide surface directed toward the inner side of the bend.

Due to the guide surface located on the inner side of the bend in the separating member, the chipping edge of each tooth becomes considerably narrower, whereby the chipped tissue becomes less in volume, thereby decreasing the danger of chipped bone tissue in the meat. The guide surface located on the inside moreover ensures that the chipped material is carried away to the inside of the separating member.

In one embodiment the separating member takes a tubular form. The invention is nevertheless also suitable for a band saw type of device.

In order to obtain optimum operation, at least a part of the series of teeth may be offset in outward direction (as shown in dashed lines in FIG. 3), which part is a maximum of 40% of the whole number of the teeth in the series.

For low-noise operation the outwardly offset teeth are distributed at random over the series of teeth.

The invention further proposes to place the teeth obliquely relative to the direction of rotation.

According to the invention the tooth is provided with a cutting edge which, as seen in the sawing direction, runs forward from the inner side of the bend in oblique and/or sharply bent manner, wherein the guide surface connects onto the first part thereof such that the cutting edge is larger than the thickness of the blade material.

It has further been established in tests that an optimal operation is obtained if the area bounded by the chipping surface of a tooth and the rear edge of the preceding tooth is a maximum of 4 mm$^2$.

The invention further relates to a device for mutual in-line fixing of a tubular member to a pipe-shaped carrier, wherein the pipe-shaped carrier is provided on the end with a stop surface against which the tubular member lies, and the tubular member is mounted in a bush for coupling to the pipe end, and wherein a wedge-like clamping means is arranged between bush and tubular member, this such that the tube can be connected exchangeably to the pipe-shaped carrier.

With such a device the tubular cutting member can be arranged for easy replacement on a pipe-shaped carrier. The separating member can, once it is worn, also be replaced simply and quickly herewith.

BRIEF DESCRIPTION OF THE DRAWINGS

Above mentioned and other features of the invention will be further elucidated in the figure description of an embodiment herein below. In the drawing.

DESCRIPTION OF THE PREFERRED EMBODIMENT

Figure 1:
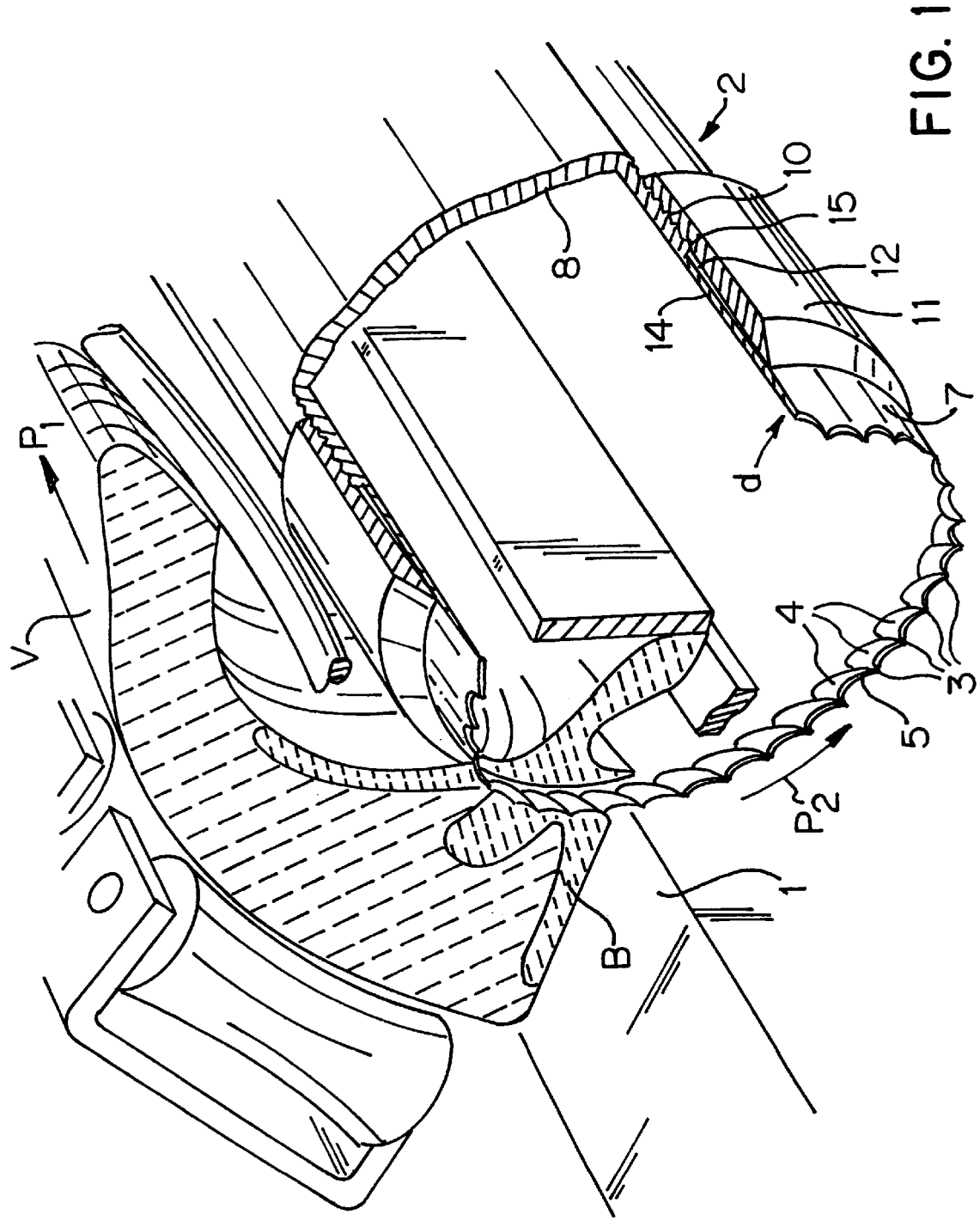
FIG. 1 shows a perspective view of a separating member according to the invention which is mounted in a pipe-shaped carrier which is arranged rotatably relative to a meat support.
Figure 2:
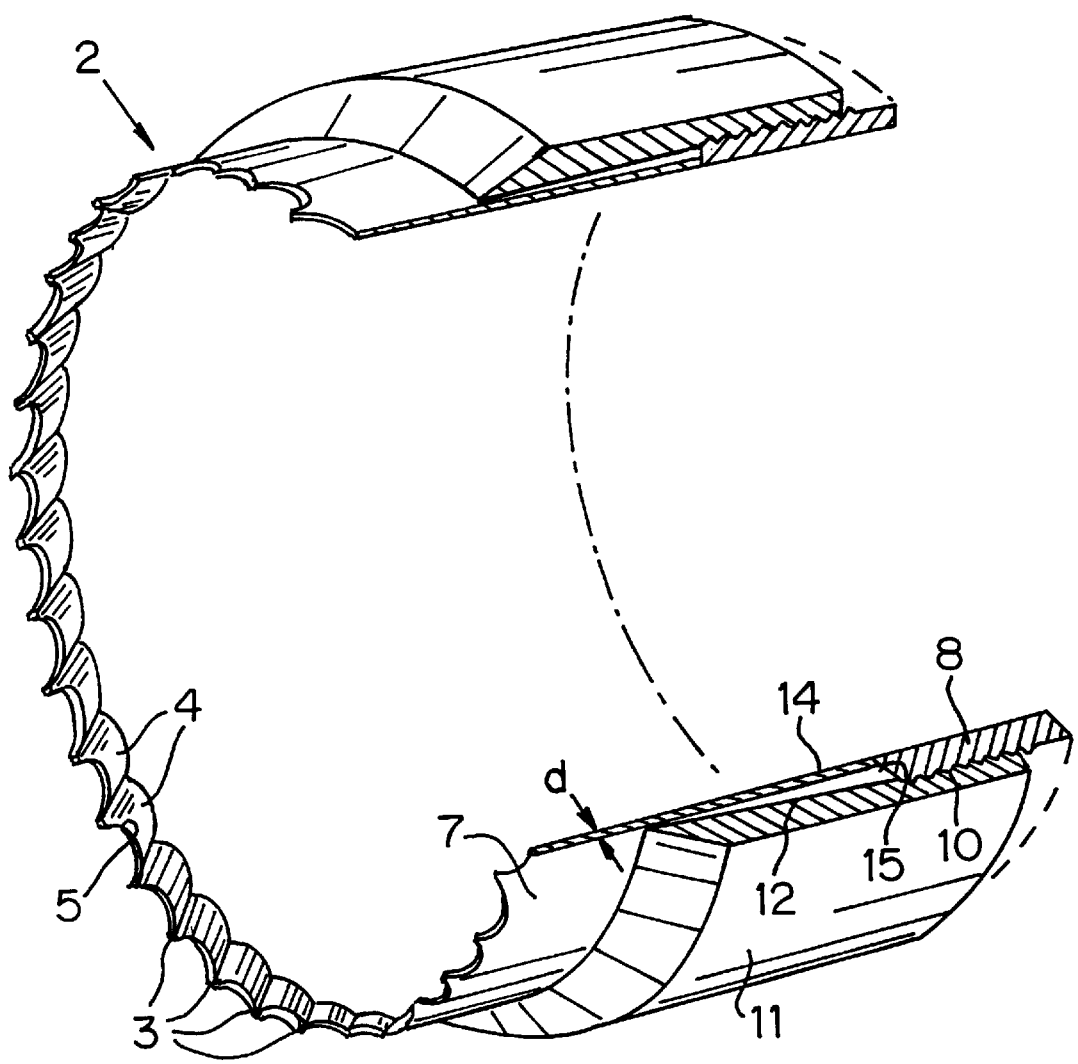
FIG. 2 shows a view corresponding with FIG. 1 on larger scale.

In the figures the numeral 1 indicates the support on which a meat piece V can be moved in the direction of arrow P1 by any conventional means which otherwise fall outside the scope of the invention. Meat piece V comprises a bone tissue, here in the form of a spine, which must be separated from meat piece V.

Separating member 2 takes a tubular form and is provided on the leading edge with a series of teeth 3. Thus results on the leading side in a saw-like system of teeth which, driven in the direction of arrow P2, is capable of sawing through bone tissue B. The series of teeth must however also be suitable for separating meat tissue where this is necessary. It has been determined experimentally that this dual function cannot be performed properly with a conventional saw.

According to the invention the tooth is adapted by arranging a guide surface 4 on the inner side of the tooth, i.e. the guide surface is directed toward the centre line of separating member 2. On the outside the tubular separating member is practically cylindrical.

Guide surface 4 can be formed for instance by means of a grinding operation on the inner side of the tubular member, which guide surface extends as far as the cutting edge 5 of each tooth. The cutting edge of the saw tooth is thereby given a sharply bent form and becomes longer than the thickness d of the material from which the tubular separating member is manufactured.

Figure 4:
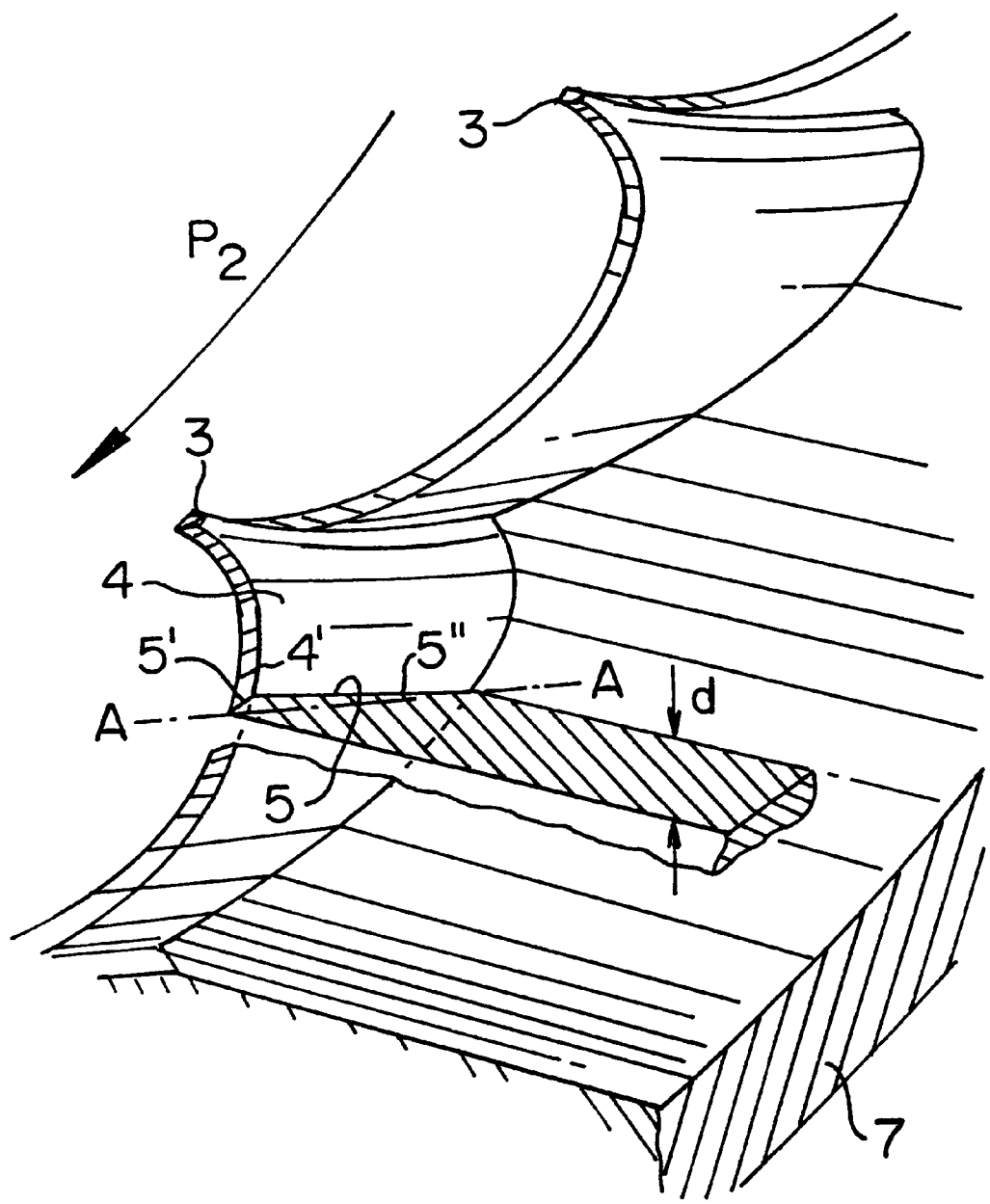
FIG. 4 shows a detail of a tooth for a tubular separating member as according for instance to FIG. 2.

FIG. 4 shows clearly that tooth 3 is provided with a cutting edge 5 which runs obliquely relative to the direction of rotation P2. At least the first part 5' onto which the guide surface 4 connects runs obliquely forward from the inner side of the bend, whereafter the second part 5" of the cutting edge is defined by the width of guide surface 4. The width of the chipping surface 4' connecting onto the second part of the cutting edge 5" is thereby defined. The width of this chipping surface 4' is roughly one-third to one-half the thickness d of the material from which the saw blade is manufactured.

The invention further proposes that the imaginary line A—A connecting both end points of cutting edge 5 encloses an angle with the perpendicular lying transversely of the direction of rotation P2, which angle lies between 30 and 75° and is preferably 40 to 50°.

It has been determined experimentally that the teeth must have a particular size for optimal severing of the bone tissue.

Figure 3:
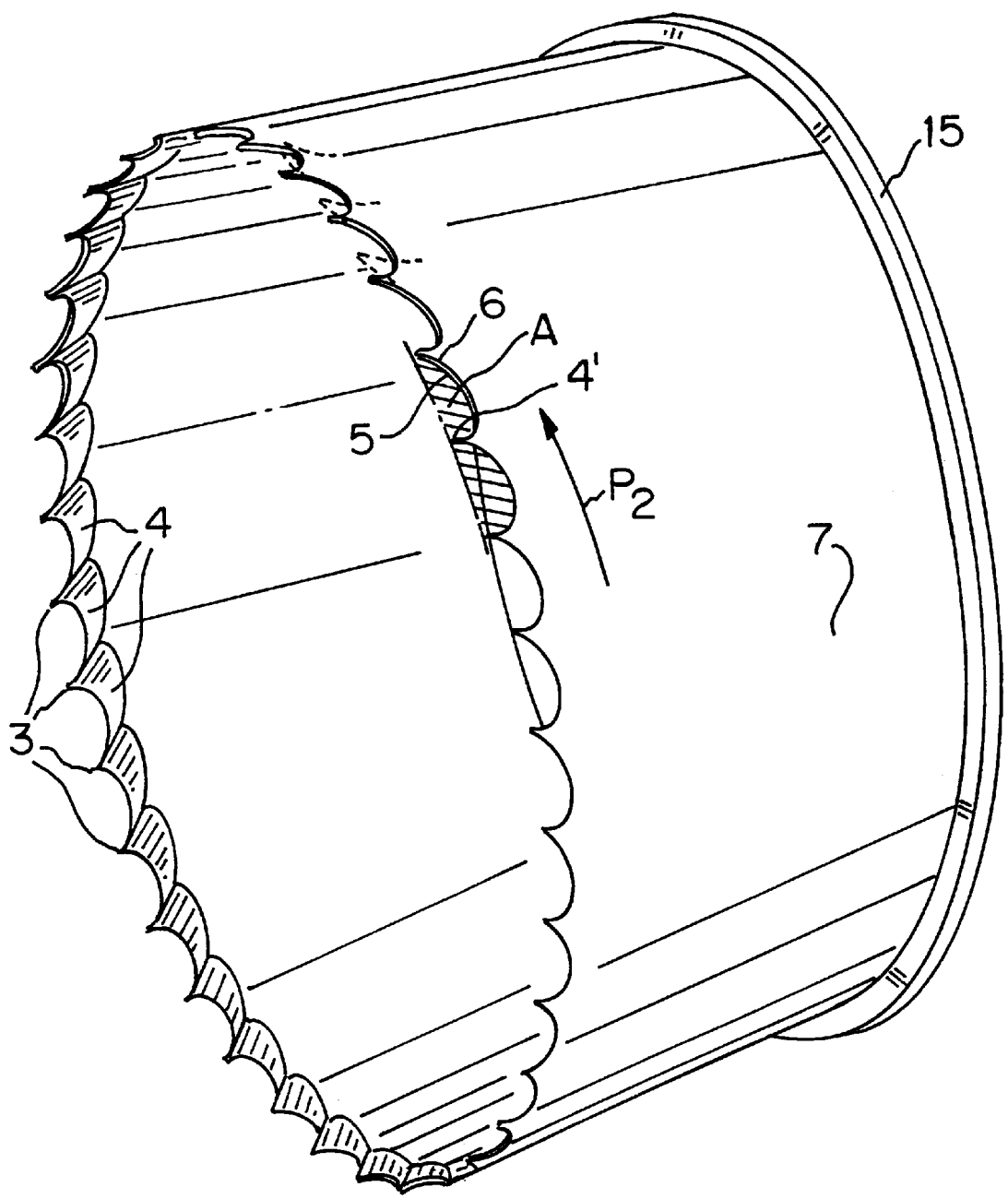
FIG. 3 shows a perspective view of the tubular separating member as applied in the device of FIG. 1.

This size is determined by the hatched area A in FIG. 3 which is bounded by the chipping surface 4' of a tooth and the rear edge 6 of a preceding tooth. The area thereof is a maximum of 4 mm$^2$.

It is further desirable according to the invention to embody the tubular sawing member as a bush 7 which is mounted exchangeably in a pipe-shaped carrier 8. Bush 7 can be made from a strip of material which is first provided along one side with the teeth 3 and is then bent cylindrically to the form as shown in the figures, see FIG. 3 in particular.

For the purpose of exchange the pipe-shaped carrier 8 is embodied on the front side in FIG. 1 with a screw thread 10 which co-acts with the inner thread of a screwed sleeve 11.

Screwed sleeve 11 is embodied not only with the screw thread part but also with an inner surface 12 widening toward the rear. According to the invention a wedge-shaped filler piece 14 is placed between screwed sleeve 11 and the outside of bush 7.

The tubular separating member 2 can further be embodied according to the invention with an outward protruding flange 15 which can be fixed as separate ring on the outer side of bush 7 or can be bent out of the same material of the bush. Flange 15 can also be replaced by protrusions distributed evenly along the periphery.

It will be apparent from the above description of the drawing that exchanging of the bush can take place in simple manner by loosening sleeve 11 and axial forward removal thereof, removing the wedge-shaped ring or filler piece 14 and subsequently removing bush 7. Re-mounting of a new bush 7 takes place in reverse sequence. On account of the wedge-shaped filler piece 14 the separating member 2 is clamped firmly onto carrier 8. If the flange 15 is omitted, the bush does not have to be removed completely.

The invention is not limited to the above described embodiment, and particularly not to the manner in which the tubular separating member 2 can be connected for exchanging.

The series of teeth can take any desired form within the scope of the appended claims.

What is claimed is:

1. A device for separating bone material from meat tissue in a meat piece, comprising:
   a support for supporting the meat piece for processing; and
   a curved separating member having an inner side and a curved separating edge which is movably driven relative to the support and is made from plate material, wherein the separating edge includes a series of teeth, each of which includes a guide surface directed toward the inner side to guide chipped material to the inner side of the separating member.

2. The device as claimed in claim 1, wherein the separating member is a tubular member having a substantially smooth cylindrical outer side adjacent the separating edge.

3. The device as claimed in claim 1, wherein each tooth has a cutting surface having a first part and a second part, wherein the guide surface connects onto the first part of the cutting surface and a chipping surface connects onto the second part of the cutting surface, which chipping surface has a width of about a third to a half of a thickness of the plate material.

4. The device as claimed in claim 1, including a chipping surface placed obliquely relative to a direction of rotation of the separating member.

5. The device as claimed in claim 1, wherein an area viewed transversely of the separating edge and bounded by a chipping surface of a first tooth and a rear edge of a preceding tooth is a maximum of 4 mm$^2$.

6. The device as claimed in claim 1, wherein each tooth includes a cutting edge which, viewed in a direction of sawing, extends from the inner side in at least one of an oblique or sharply bent manner, such that the cutting edge is larger than a thickness of the plate material.

7. The device as claimed in claim 6, wherein a line segment through an end point of the cutting edge located at the guide surface and an opposite end point of the cutting edge encloses an angle of between 30° and 75° with the outside of the separating member.

8. The device as claimed in claim 1, wherein at least a part of the series of teeth is offset in an outward direction, which part is a maximum of 40% of a total number of the teeth in the series.

9. The device as claimed in claim 8, wherein the teeth offset in the outward direction are randomly distributed among the non-offset teeth.

10. The device as claimed in claim 9, wherein each tooth includes a cutting edge which, viewed in a sawing direction, extends from the inner side in at least one of an oblique or sharply bent manner, such that the cutting edge is larger than a thickness of the plate material.

11. The device as claimed in claim 9, wherein each tooth has a cutting surface having a first part and a second part, wherein the guide surface connects onto the first part of the cutting surface and a chipping surface connects onto the second part of the cutting surface, which chipping surface has a width of about a third to a half of a thickness of the plate material.

12. The device as claimed in claim 8, wherein each tooth has a cutting surface having a first part and a second part, wherein the guide surface connects onto the first part of the cutting surface and a chipping surface connects onto the second part of the cutting surface, which chipping surface has a width of about a third to a half of a thickness of the plate material.

13. The device as claimed in claim 8, wherein each tooth includes a cutting edge which, viewed in a sawing direction, extends from the inner side in at least one of an oblique or sharply bent manner, such that the cutting edge is larger than a thickness of the plate material.

14. The device as claimed in claim 8, including a chipping surface placed obliquely relative to a direction of rotation of the separating member.

15. The device as claimed in claim 1, wherein the separating member is a tubular member driven rotatably round a centre line of the tubular member.

16. The device as claimed in claim 15, wherein each tooth includes a cutting edge which, viewed in a sawing direction, extends from the inner side in at least one of an oblique or sharply bent manner, such that the cutting edge is larger than a thickness of the plate material.

17. The device as claimed in claim 15, wherein each tooth has a cutting surface having a first part and a second part, wherein the guide surface connects onto the first part of the cutting surface and a chipping surface connects onto the second part of the cutting surface, which chipping surface has a width of about a third to a half of a thickness of the plate material.

18. The device as claimed in claim 2, wherein at least a part of the series of teeth is offset in an outward direction, which part is a maximum of 40% of the whole number of the teeth in the series.

19. The device as claimed in claim 15, including a chipping surface placed obliquely relative to a direction of rotation of the separating member.

20. The device as claimed in claim 15, wherein an area viewed transversely of the separating edge and bounded by a chipping surface of a first tooth and a read edge of a preceding tooth is a maximum of 4 mm$^2$.

* * * * *

UNITED STATES PATENT AND TRADEMARK OFFICE
CERTIFICATE OF CORRECTION

PATENT NO. : 6,152,815
DATED : November 28, 2000
INVENTOR(S) : Jan Johannes Meerdink et al.

Page 1 of 1

It is certified that error appears in the above-identified patent and that said Letters Patent is hereby corrected as shown below:

Column 2,
Line 59 "bladc" should read -- blade --.

Column 4, claim 18,
Line 55, "claimed in claim 2" should read -- claimed in claim 15 --.

Column 4, claim 20,
Line 64, "read edge" should read -- rear edge --.

Signed and Sealed this

Twenty-third Day of October, 2001

Attest:

*Nicholas P. Godici*

NICHOLAS P. GODICI
*Acting Director of the United States Patent and Trademark Office*

*Attesting Officer*